United States Patent
Wozniak et al.

(10) Patent No.: US 7,259,888 B2
(45) Date of Patent: Aug. 21, 2007

(54) IMAGE FILE BIT DEPTH EXPANSION AND SUBSEQUENT MANIPULATION

(75) Inventors: Terry Wozniak, Springfield, OH (US); Michael J. Piatt, Dayton, OH (US); Joseph P. Mangan, Dayton, OH (US)

(73) Assignee: Eastman Kodak Company, Rochester, NY (US)

( * ) Notice: Subject to any disclaimer, the term of this patent is extended or adjusted under 35 U.S.C. 154(b) by 993 days.

(21) Appl. No.: 10/336,376

(22) Filed: Jan. 3, 2003

(65) Prior Publication Data

US 2004/0130734 A1    Jul. 8, 2004

(51) Int. Cl.
*H04N 1/393* (2006.01)
*H04N 1/407* (2006.01)
*H04N 1/54* (2006.01)
*H04N 1/60* (2006.01)

(52) U.S. Cl. .................. 358/1.2; 358/1.9; 358/3.01; 358/3.21; 358/504; 358/518; 358/521; 358/528

(58) Field of Classification Search ............... 358/1.2, 358/1.9, 3.01, 3.07, 3.08, 3.21, 3.24, 3.26, 358/504, 518, 521, 528, 451, 463, 406
See application file for complete search history.

(56) References Cited

U.S. PATENT DOCUMENTS

| | | | | |
|---|---|---|---|---|
| 5,854,883 A | * | 12/1998 | Madeley ................... | 358/1.9 |
| 6,615,727 B2 | * | 9/2003 | Komori et al. ............ | 101/484 |
| 6,792,864 B2 | * | 9/2004 | Piatt et al. ................ | 358/1.9 |

* cited by examiner

*Primary Examiner*—Scott A. Rogers

(57) ABSTRACT

The present invention addresses the reformatting of a digital "ready to print" data file into a continuous tone (32 or 24 bit) file whereby discrete values in the tone range are uniquely assigned to specific binary combinations. The purpose for this transform is to facilitate further manipulation of pre-processed data. One application of the present invention is to exist as a critical piece of proofing workflow for a technology that reduces continuous tone data into a binary form representing droplet selection prior to output.

13 Claims, 3 Drawing Sheets

| 2 | 1 | 0 | 0 | 0 | 2 |
|---|---|---|---|---|---|
| 2 | 2 | 1 | 0 | 0 | 2 |
| 2 | 1 | 2 | 1 | 0 | 2 |
| 2 | 0 | 1 | 2 | 1 | 2 |
| 2 | 0 | 0 | 1 | 2 | 2 |
| 2 | 0 | 0 | 0 | 1 | 2 |

18:

| 255 | 128 | 0   | 0   | 0   | 255 |
|-----|-----|-----|-----|-----|-----|
| 255 | 255 | 128 | 0   | 0   | 255 |
| 255 | 128 | 255 | 128 | 0   | 255 |
| 255 | 0   | 128 | 255 | 128 | 255 |
| 255 | 0   | 0   | 128 | 255 | 255 |
| 255 | 0   | 0   | 0   | 128 | 255 |

| 2 | 1 | 0 | 0 | 0 | 2 |
|---|---|---|---|---|---|
| 2 | 2 | 1 | 0 | 0 | 2 |
| 2 | 1 | 2 | 1 | 0 | 2 |
| 2 | 0 | 1 | 2 | 1 | 2 |
| 2 | 0 | 0 | 1 | 2 | 2 |
| 2 | 0 | 0 | 0 | 1 | 2 |

22:

| 0 | 0   |
|---|-----|
| 1 | 142 |
| 2 | 200 |

24:

| 200 | 142 | 0   | 0   | 0   | 200 |
|-----|-----|-----|-----|-----|-----|
| 200 | 200 | 142 | 0   | 0   | 200 |
| 200 | 142 | 200 | 142 | 0   | 200 |
| 200 | 0   | 142 | 200 | 142 | 200 |
| 200 | 0   | 0   | 142 | 200 | 200 |
| 200 | 0   | 0   | 0   | 142 | 200 |

| 1 | 1 | 1 | 0 |
|---|---|---|---|
| 1 | 1 | 0 | 0 |
| 1 | 0 | 0 | 0 |
| 0 | 0 | 0 | 0 |

40:

| 1 | 0 |
|---|---|
| 0 | 0 |

IMAGE FILE BIT DEPTH EXPANSION AND SUBSEQUENT MANIPULATION

TECHNICAL FIELD

The present invention relates to image processing and, more particularly, to image processing of digital data purposed for color management to an output device.

BACKGROUND ART

In traditional offset printing, a facsimile of the final document to be printed for the purpose of proofing may typically be created on a slow, high quality, low volume desktop device for customer approval. It is the intent of the offset press to match this proof. Such a proof is called a contract proof. Until recently, the resolution of the typical offset press greatly exceeded the resolution of most commercial "off the shelf" inkjet printers. Prior to the use of digital inkjet proofs, the contract proof may have been created using the exact film that would be used to image the plates for the offset run. By using similar ink, and similar media, the high quality proofing system could be made to match the offset press in both dot structure and color. The customer may sign the single copy produced by the proofer and attend the press run to make sure that the offset press output matched the proof prior to the start of mass production. Proof copies would typically not be created directly on the press due to the cost, waste, make-ready time and lost production time. The offset press is designed to make thousands or more copies while the high quality proofer would be optimized for creating just a single copy.

Present high quality inkjet proofers, on the order of 2400 or more dots per inch (dpi) have greatly reduced the time and expense involved in creating an offset proof. These high quality devices can now mimic the high quality achieved on an offset press. However, high speed digital inkjet presses print at a resolution lower than the desktop inkjet proofing devices. A proof of the continuous tone data produced by one of these devices exceeds the quality and character of output achievable on the digital press.

In order to better mimic the output of the digital press and to allow the digital press to meet or exceed the quality found on these proofs, the apparent resolution of these desktop proofing devices must be lowered to match that of the digital press. This is best accomplished on devices which have resolutions that are multiples of the lower resolution digital press. Merely reducing the resolution of the data to an arbitrarily low resolution not matching that of the press will not reproduce the apparent graininess of the digital press. Additionally, the preprocessing of data to binary form constrains options of further data manipulation.

It is seen, therefore, that it would be desirable to group or convert binary data files or groups of data files to allow such files to be manipulated in ways not possible in native binary formats.

SUMMARY OF THE INVENTION

The present invention provides a means to generate image proofs that accurately match the color and texture of the digital press images. The continuous tone data, represented as multiple bits per CMYK channel, will be reproduced at the selected output resolution. The present invention allows for the repurposing of binary image data by transforming it into a multi-bit data file of discrete values that are representative of the number of droplets printed. Single pixel or multiple pixel binary data are mapped to discrete values of a multi-bit image file format. Although it may not be possible to undo the steps leading to the creation of the binary file, depending on the available information used to create the binary file in the first place, it is certainly possible to further manipulate the newly created multi-bit file to for a number of purposes. These purposes may include, but are not limited to, proofing on another digital device, correcting the data for the output device of its original intent, performing color management of and from coordinates system mapping, modification of pixel resolution, manipulation of a single image plane of a multi-colored image, and so forth.

In accordance with one aspect of the present invention, a method is provided for reducing continuous tone data into a binary form prior to output. To achieve a workflow for such a reduction, the image is separated into the 8 bit color planes (CMYK). Each 8 bit color plane is reduced from 8 bits down to 1 bit by suitable means, such as error diffusion. Error diffusion is a mathematical process which determines how to best represent an 8 bit image using only 1 bit. Each pixel of the 8 bit file is examined, and when an exact representation cannot be made by a 1 bit pixel, the error between the 1 bit representation and the 8 bit representation is passed on to neighboring pixels such that over a large area, the 1 bit representation will approximate the 8 bit original.

Other objects and advantages of the invention will be apparent from the following description, the accompanying drawings and the appended claims.

BRIEF DESCRIPTION OF THE DRAWING

FIGS. 4 and 5 illustrate direct scaling from discrete values;

FIG. 7 shows the scaling of a binary file.

DETAILED DESCRIPTION OF THE PREFERRED EMBODIMENTS

Figure 1:
FIGS. 1-3 illustrate organization of binary data for a high speed digital color ink jet printer.

In accordance with the present invention, a ready-to-print binary press file is repurposed for the proofing device. A substitution color pallet can be created, with all of the possible colors that the press can create. The substitution table can be based on pixel color or other suitable criteria. In the color substation process, one neutral color is included that contains no printed droplets in the macro (viewed at normal reading distance without magnification) pixel. This color is used to map the color of the paper on the press to the proofing device.

The print artifacts to be reproduced on the proofing device are a function of the primary resolution and the dot dispersion algorithm. Primary resolution can be defined as the smaller of the two orthogonal print resolutions of a digital press. The primary resolution determines the macro print quality because the dot size of individual ink droplets must be of sufficient size to allow substantial coverage at the primary resolution. Hence, there is typically substantial overlap of dots at the higher resolution of the rectangular grid. Dot size and dot spacing determine image quality, along with the method of dispersing the dots. Since patterns at the highest resolution in the original digital file are lost in the conversion to a square resolution. The present invention, therefore, represents square resolution characteristics and not exact reproduction of the higher resolution droplet ordering.

The assignment of digital values to the macro or "super" pixel can be based on various criteria. One criteria is the percentage of ink printed in the macro pixel. This is a percentage of pixels in the grid that contain ink. Another criteria may be the density represented by printing a specific number of pixels in the grid. Alternatively, the color, i.e., lightness, saturation and hue, of the printed pixels in the grid can be used to index a specific value from a table in the conversion to a multi-bit file. It will be obvious to those skilled in the art that many varying criteria can be used, in addition to or in conjunction with the criteria described herein for exemplary purposes, without limiting the scope of the invention.

The present invention optimizes the resolution match between a contract proof and a digital color press run of the same image. In order to simulate the apparent "graininess", or dot structure, of the digital press on these high quality devices, the continuous tone files must also be limited to the number of discrete colors that the digital press can reproduce. The proofing device should be of equal or greater resolution as compared to the primary resolution of the press. In a preferred embodiment, the proofing device should be as large as or larger than the higher resolution of the rectangular resolution of the press. This is necessary so that there will be a sufficient number of substitutions on the proofing printer. A single primary resolution pixel from the press is represented by dots on the proofing device. The dots may be of a different number, size, shape, and individual colorants than that of the actual press. The conglomerate of printed pixels on the higher resolution proofing printer combine to create a single primary resolution pixel that accurately represents the color, size, shape, and graininess of the press. Several methods can be used to enhance the graininess of the resulting proof output and thereby approximate the output quality of the digital press.

Prior to printing on the digital press, image data intended for the press is stored in a binary format that represents discrete droplets of ink to be printed. A single bit file is sent to each printhead (C, M, Y & K) to represent which drops will print and which will not, accurately representing the pixel bitmap. This data is stored as separate binary files, which cannot be directly combined into any conventional file format or sent directly to any other printing device. The discrete data files can be mathematically recombined into new multi-bit data file format in such a way that a single value can be registered for the number and combination of drops of ink that would be printed in each pixel location. The resulting continuous tone data file could then be accessed and manipulated through conventional proofing workflows. The result of using such a file in a conventional proofing process allows not only the color of the digital press to be captured, but also the character and apparent quality as well.

The speed and flexibility of new digital printing presses require that massive amounts of data be preprocessed into binary form so that it is instantaneously available for printing without the need for further data reduction. Image data stored in binary form directly corresponds to the droplet selection of binary continuous inkjet printing systems, thus eliminating the need to translate the data into a more usable form in real time at the print speed. The preprocessing of data to binary form constrains options of further data manipulation. The binary data has already been reduced through dithering techniques, such as error diffusion, into the simplest form representing a droplet printing sequence. Processing steps leading to the development of a binary file may further include tone scale correction, adjustments for specific press calibration, color management through International Color Consortium (ICC) profiles, and so forth. It is not possible to further manipulate or to undo the steps used to create the binary file once it has been reduced to its simplest form. Essentially, the creation of the binary file is the reduction of information content, sometimes by an order of magnitude, from the original multi-bit image data. As previously stated, the binary file is specifically targeted for a particular imaging device having accounted for the specifics of that device.

In many such digital printing presses, such as inkjet printers, it is possible to print multiple gray scale levels by superimposing multiple ink drops onto one pixel location. For example, in one printer having a 300×300 pixel/inch resolution, a pixel location might be printed with 0 to 2 ink drops from a single orifice in the drop generator for each color of ink. In such a system, the ready-to-print data file has data corresponding to the 300 pixels per inch parallel to the array of orifices, but data corresponding to 2 times the 300 pixels per inch in the paper feed direction, for each ink color printed. As the multiple drops per pixel typically merge to form a single dot on the paper, it is desirable for the creation of proofing images to consider such a print as a multiple density 300×300 dot per inch printer rather than a 300×600 dot per inch printer.

Figure 2:

FIG. 2 shows data from a ready-to-print data file corresponding to one of the colors planes of the digital press. Each column in the table corresponds to a jet in the array of printable jets. Each row corresponds to a printable drop from each of the jets. In this case, each pixel corresponds to two consecutive drops from a jet, as indicated by the line width between rows. A "1" in a cell corresponds to printing the drop, while no drop is printed when the cell is blank.

Figure 3:

The first transformation to be used according to the present invention is to merge consecutive cells as shown in FIG. 3, where the number shown corresponds to the number of drops printed in the pixel. The data file is now compressed to a square pixel resolution of 300×300 pixels per inch for each ink color, but the data is no longer binary.

For an exemplary digital color press, having four ink colors capable of printing zero, one, or two drops per pixel, each pixel has 81 ($3^4$) possible inking combinations. By printing with the digital color press and measuring the color of each of these 81 possible inking combinations, one can generate a transformation table or function relating each inking combination to the resultant color.

Using the transformation table or function, pixel by pixel the compressed image data for each color separation can be evaluated to produce a continuous tone output value for the pixel in the data file for the proofing system. The transformation table can make the transform in the corresponding L*a*b* color space coordinates or into any other suitable color space coordinates.

The resultant continuous tone output file retains the resolution and color characteristics of the digital color press image, but is in a form suitable for directing to a high resolution color proofing printer, such as a printer that has color management through International Color Consortium (ICC) profiles. As the proofing printer has a much higher resolution than the digital color press, the color management software associated with the proofing printer typically has sufficient color gamut to provide a matching color on the proofing printer for each of the 81 inking options of the digital color press even if the ink colors of the proofing printer don't match those of the digital color press.

It is to be understood that while the exemplary system involved a digital press having 3 printable densities for each of 4 ink colors, the present invention is not limited to this configuration. The number of printable densities per color or the number of ink colors can differ from the exemplary system, without departing from the scope of the invention.

The present invention addresses the reformatting of a digital ready-to-print data file into a continuous tone (32 or 24 bit) file whereby discrete values in the tone range are uniquely assigned to specific binary combinations. The purpose for this transform is to facilitate further manipulation of preprocessed data. One application of the present invention is to exist as a critical piece of proofing workflow for a technology that reduces continuous tone data into a binary form representing droplet selection prior to output. Whether this binary form represents a square resolution such as 300×300 dots per inch (dpi) with discrete values of 'on' or 'off', as illustrated by table 10 in FIG. 1; or a non-square resolution such as 300×600 dpi with discrete values of 'on' or 'off', as illustrated by table 12 in FIG. 2; or a square resolution with multiple discrete values such as 300 dpi with values such as 0, 1, 2, as illustrated by table 14 in FIG. 3, the information content contained in these data structures is similar, and in some cases analogous. All of the possible analogous representations of binary data can then be later combined into the continuous tone representation in accordance with the present invention, as shown in FIG. 4.

Once reduced to this format, the data exists in a form optimized for a particular device, and direct manipulation of this data is difficult. The present invention provides a solution to this dilemma by converting this data from its binary form into a continuous format either directly, as shown by tables 16 and 18 in FIG. 4, or through some mapping function 22 such as is shown by tables 20 and 24 in FIG. 5. The data retains discrete properties while existing in the continuous tone continuum.

Figure 6:
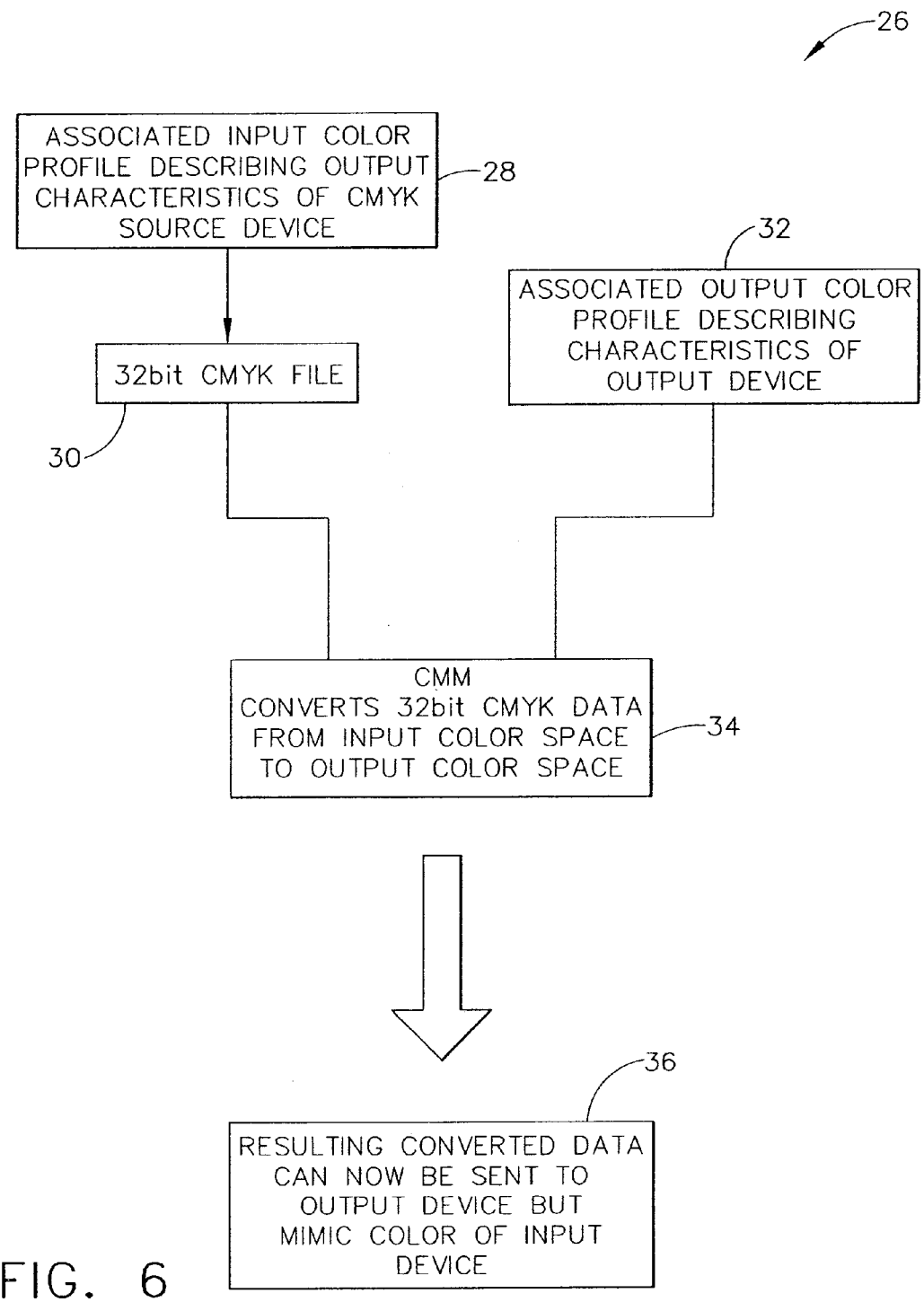
FIG. 6 is a block diagram illustrating the continuous tone manipulations that are possible as a result of a binary to continuous tone file conversion.

Once in the continuous tone format, the data can then be manipulated in many different ways, which were previously impossible or difficult when existing as discrete files. In one such application, the resulting file could be color managed by applying 4-dimensional transformations to convert the discrete tone values into the color space of a proofing device via an International Color Consortium (ICC) workflow, as illustrated by flow diagram 26 in FIG. 6. In FIG. 6, an associated input color profile describing the output characteristics of the CMYK source device from block 28 is applied to the 32-bit CMYK file at block 30. An associated output color profile describing the characteristics of the output device are illustrated by block 32. Color management is applied at block 34 to convert the 32-bit CMYK data from input color space to output color space. This conversion involves mapping the new continuous tone representation of each pixel into any device independent n-bit color space. The new continuous tone representations possess more data when combined and converted than the previous binary file or files. This allows the data to be meaningfully converted. The resulting converted data, represented by block 36, can then be sent to an output device that can mimic the color of the input device.

Such a conversion is superior to a similarly color managed workflow that starts with the original continuous tone data. When comparing workflows, the conventional workflow starts with the original source continuous tone data, and applies color management to achieve a color correct output that is of a higher quality than is achievable on the lower resolution digital printer. However, the output from the workflow according to the present invention, that takes the actual binary data destined for the digital printer, and combines the binary data back into a continuous tone form for color management, matches both the tone and the character (graininess) of the original. Application of the present invention, therefore, gives the customer an opportunity to view a contract proof that essentially matches the output and image quality that will be achieved in a mass printing.

Typically, the original binary file is of a non-square resolution which ultimately mapped into a square resolution of higher resolution for output to a proofing device. Multiple droplets of ink are placed in closer proximity in one direction, relative to the orthogonal direction, to create visually discrete tone levels at the lower orthogonal spatial resolution. Any original patterning structure of the binary file are lost, but the characteristic dot structure of the image is preserved. When using the binary files directly to proof some output device, it is often necessary to match the paper white of the source device that outputs the binary files directly. In order to match the paper white of the source device, the destination data must be mapped into some continuous tone value of the proofing device such that the result will approximate the color of the paper of the source device. In addition, the tint of paper white could be mathematically added or subtracted from the rest of the data in order to mimic a different output substrate.

The continuous tone data can also be linearized as independent color planes from intermediate values not represented in binary form to intermediate values not representable in binary files. Such mappings could linearize the color planes independently, based on tonal output. Also, when scaling a binary file, or set of files, it is not possible to represent a 50% pixel, or any value between 0-100% that would best represent the resulting scaled continuous tone example, as is illustrated by tables 38 and 40 in FIG. 7.

The present invention provides for a method of reformatting on a separate output device, one or more digital data files of lower bit depth, including but not limited to binary files, into one or more discrete multi-bit values of higher bit depth, for the purpose of reproduction of visual artifacts present in an original image. The digital printer and substrate for which the original digital data file or files was intended is identified, and the digital data file or files are combined into discrete multi-bit values of higher bit depth that are available for further manipulation as a continuous tone file. The output characteristics of the digital printer can be identified, including but not limited to the printer resolution, the principal color palette, dot size, etc. With the present invention, the digital data files can be reformatted from M to N numbers of files. The digital data file can be a single color plane convertible into a single color output file. Alternatively, the digital data file can be a plurality of files, such as four, with a separate data file for each color plane, convertible into a single, multi-color output file. The continuous tone file can be limited to the number of discrete colors that the digital printer can reproduce, and discrete values in the continuous tone file can be assigned to specific binary or other digital combinations. Data can then be converted from the specific digital combinations into a continuous format, such as by a mapping function. The continuous format data can be manipulated, such as by color managing, applying 4-dimensional transformations to convert discrete tone values into color space of a proofing device via an International Color Consortium workflow.

In accordance with the present invention, grouping or converting digital data files or groups of data files allows such files to be manipulated in ways not possible in the native binary format(s). For example, sharpening/blur filters can be applied to data and then the data can be dithered again. Also, the file can be directed to another device, or converted to RGB, or converted from four color to six color then back to binary. A new one-dimensional conversion can be applied and then dither can occur. Resolution of a binary file as represented can be changed to a continuous tone file. The transformations achieved by reformatting digital binary data files into continuous tone files allow for repurposing of a file for another device such as a proofer, recalibrating of an image for the same device that has changed, and identifying and manipulating control parameters such as average density function. Additionally, resolution can be manipulated for the same or another device. Finally, color management can be applied to shift color in one direction based on user request, match color to another device, or control color in an unstable system.

The invention has been described in detail with particular reference to certain preferred embodiments thereof, but it will be understood that modifications and variations can be effected within the spirit and scope of the invention.

What is claimed is:

1. A method of reformatting at least one original digital data file of lower bit depth for the purpose of reproduction of visual artifacts present in an original image on another output device, the method comprising the steps of:
   identifying a digital printer and a substrate for which the at least one original digital data file was intended;
   combining the at least one original digital data file into discrete multi-bit values of higher bit depth that are available for further manipulation as a continuous tone file, whereby visual artifacts are maintained.

2. A method as claimed in claim 1 wherein the step of identifying further comprises the step of identifying output characteristics of the digital printer.

3. A method as claimed in claim 1 wherein the at least one digital data file comprises a binary file.

4. A method as claimed in claim 1 wherein the at least one digital data file comprises a single color plane convertible into a single color output file.

5. A method as claimed in claim 1 wherein the at least one digital data file comprises a plurality of files.

6. A method as claimed in claim 5 wherein the plurality of files comprise a separate data file for each color plane, convertible into a single, multi-color output file.

7. A method as claimed in claim 1 further comprising the step of limiting the continuous tone file to the number of discrete colors that the digital printer can reproduce.

8. A method as claimed in claim 1 further comprising the step of assigning discrete values in the continuous tone file to specific digital combinations.

9. A method as claimed in claim 8 further comprising the step of directly converting data from specific digital combinations into a continuous format.

10. A method as claimed in claim 8 further comprising the step of applying a mapping function to convert data from specific digital combinations into a continuous format.

11. A method as claimed in claim 10 further comprising the step of manipulating the continuous format data.

12. A method as claimed in claim 11 wherein the step of manipulating comprises the step of color managing the continuous format data.

13. A method as claimed in claim 12 wherein the step of color managing comprises the step of applying 4-dimensional transformations to convert discrete tone values into color space of a proofing device via an International Color Consortium workflow.

* * * * *